United States Patent
Han et al.

(10) Patent No.: US 6,884,977 B2
(45) Date of Patent: Apr. 26, 2005

(54) VARIABLE-FREQUENCY INVERTER MICROWAVE OVEN AND METHOD FOR CONTROLLING THE SAME

(75) Inventors: Sung Jin Han, Seoul (KR); Dong Myung Shin, Kyunggi-do (KR)

(73) Assignee: LG Electronic Inc, Seoul (KR)

( * ) Notice: Subject to any disclaimer, the term of this patent is extended or adjusted under 35 U.S.C. 154(b) by 0 days.

(21) Appl. No.: 10/630,659

(22) Filed: Jul. 31, 2003

(65) Prior Publication Data

US 2004/0144776 A1 Jul. 29, 2004

(30) Foreign Application Priority Data

Jan. 27, 2003 (KR) ................................ 10-2003-0005272

(51) Int. Cl.$^7$ ................................................. H05B 6/68
(52) U.S. Cl. ...................... 219/715; 219/716; 363/49; 363/97
(58) Field of Search ................................ 219/715–721, 219/702; 363/37, 41, 49, 97, 98, 74

(56) References Cited

U.S. PATENT DOCUMENTS

| | | | | |
|---|---|---|---|---|
| 3,593,103 A | * | 7/1971 | Chandler et al. | 363/174 |
| 6,075,715 A | * | 6/2000 | Maehara et al. | 363/37 |
| 6,335,519 B1 | * | 1/2002 | Cho et al. | 219/716 |
| 2004/0118832 A1 | * | 6/2004 | Ryu et al. | 219/622 |

FOREIGN PATENT DOCUMENTS

JP  1-117293  * 5/1989

* cited by examiner

Primary Examiner—Philip H. Leung
(74) Attorney, Agent, or Firm—Greenblum & Bernstein, P.L.C.

(57) ABSTRACT

A variable-frequency inverter microwave oven and a method for controlling the same. The inverter microwave oven comprises a magnetron for generating electromagnetic waves, a direct current (DC) voltage generator for rectifying and smoothing a commercial alternating current (AC) voltage, which is an inverter drive voltage, to generate a DC voltage, and a switching device for performing a switching operation based on the DC voltage from the DC voltage generator to generate an AC voltage for the driving of the magnetron. The switching device includes a plurality of switches turned on/off in response to the DC voltage from the DC voltage generator. The microwave oven further comprises a variable-frequency controller for varying a switching frequency of the switching device according to the level of the DC voltage from the DC voltage generator to maintain the AC voltage from the switching device at a constant level, and a magnetron drive voltage generator for converting the AC voltage from the switching device into a high-power DC voltage and transferring the converted DC voltage to the magnetron to drive it. The inverter operation is improved compared with a conventional one and a magnetron drive duration is lengthened, thereby improving heating efficiency and operational reliability of the microwave oven.

15 Claims, 6 Drawing Sheets

VARIABLE-FREQUENCY INVERTER MICROWAVE OVEN AND METHOD FOR CONTROLLING THE SAME

BACKGROUND OF THE INVENTION

1. Field of the Invention

The present invention relates to variable-frequency inverter microwave ovens and methods for controlling the same, and more particularly to a variable-frequency inverter microwave oven and a method for controlling the same, wherein a constant-level voltage is supplied to a magnetron, which generates electromagnetic waves in the microwave oven, so that a drive duration of the magnetron can be lengthened, thereby improving heating efficiency and reliability of an inverter operation.

2. Description of the Related Art

Figure 1:
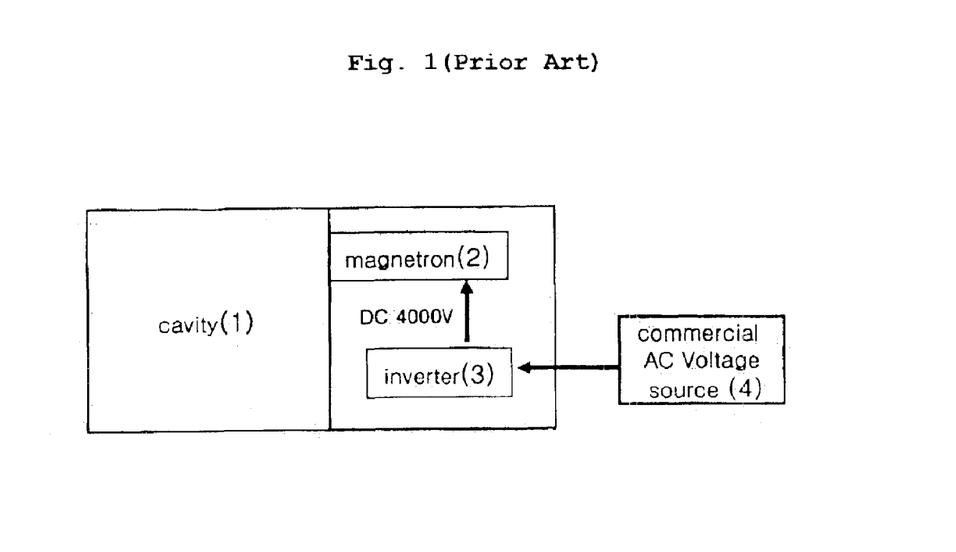
FIG. 1 is a block diagram showing the construction of a conventional inverter microwave oven.

FIG. 1 is a block diagram showing the construction of a conventional inverter microwave oven. A description will hereinafter be given of the construction and operation of the conventional inverter microwave oven with reference to FIG. 1.

The conventional inverter microwave oven is a cooking apparatus using dielectric heating, which is a kind of high frequency-based device. The dielectric heating is to radiate microwaves to food received in the oven to vibrate molecules of water in the food, thereby heating the food. This dielectric heating heats food beginning with the inside thereof in a different manner from common heating methods which heat food beginning with the surface thereof. To this end, the inverter microwave oven typically utilizes microwaves having a wavelength of about ¹/₁₀ that of TV broadcast waves.

A magnetron 2, which is a particular two-pole vacuum tube, is used as a heating source for generating microwaves. The magnetron 2 concentrates the microwaves on food through an output antenna to heat the food. An internal space of the oven where the microwaves resonate is called a cavity 1, which includes a turntable for rotating the food to heat it evenly.

The microwave oven further comprises a cooking command input unit (not shown) provided at the outer surface of the oven for enabling a user to input a cooking command, a display unit (not shown) for displaying the remaining time or elapsed time in response to the cooking command inputted through the cooking command input unit, and a door (not shown) for opening/closing the front of the cavity 1.

A commercial alternating current (AC) voltage source 4 is provided to supply a commercial AC voltage of 220V-60 Hz to a general home, in which the microwave oven is installed, to drive the magnetron 2. An inverter 3 is also provided to convert the commercial AC voltage supplied from the commercial AC voltage source 4 into a high-power direct current (DC) voltage of about 4000V or more and supply the converted DC voltage to the magnetron 2. As a result, the magnetron 2 is driven to heat and cook food in the cavity 1.

Figure 2:
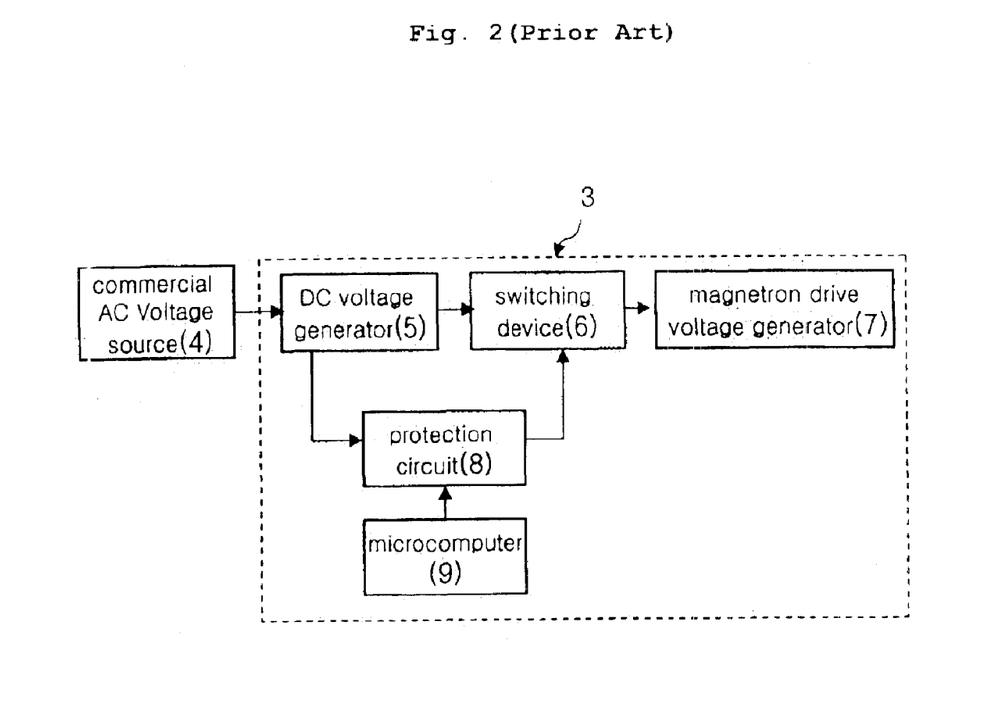
FIG. 2 is a functional block diagram of the conventional inverter microwave oven.

The construction and operation of the conventional inverter microwave oven will hereinafter be described in detail with reference to FIG. 2, which is a functional block diagram of the conventional inverter microwave oven.

The conventional inverter microwave oven comprises a DC voltage generator 5 for rectifying and smoothing the commercial AC voltage supplied from the commercial AC voltage source 4 and outputting the resulting DC voltage to a switching device 6. To this end, the DC voltage generator 5 is provided with a bridge diode.

The switching device 6 acts to perform a switching operation based on the DC voltage from the DC voltage generator 5 under control of a microcomputer 9 to generate an AC voltage, and output the generated AC voltage to a magnetron drive voltage generator 7. To this end, the switching device 6 includes a plurality of switches turned on/off in response to the DC voltage from the DC voltage generator 5. The magnetron drive voltage generator 7 functions to convert the AC voltage from the switching device 6 into a high-power DC voltage appropriate to the driving of the magnetron 2 and output the converted DC voltage to the magnetron 2.

The conventional inverter microwave oven further comprises a protection circuit 8 for measuring the level of the DC voltage from the DC voltage generator 5, inputted to the switching device 6, and, if the measured DC voltage level is higher than or equal to a predetermined threshold voltage level, turning off the switching device 6 to prevent the switches thereof from being damaged. For the convenience of description, the DC voltage generator 5, switching device 6, magnetron drive voltage generator 7, protection circuit 8 and microcomputer 9 are shown in FIG. 2 to constitute the block of the inverter 3.

However, the commercial AC voltage for the home supplied from the commercial AC voltage source 4 has voltage/current characteristics varying with regions/time zones. A DC voltage with a ripple component, generated by the DC voltage generator 5, varies with a variation in the AC voltage, resulting in a variation in an AC voltage generated by the switching device 6 because it performs a switching operation based on the DC voltage. As a result, a high-power DC voltage, generated by the magnetron driving voltage generator 7 according to the AC voltage from the switching device 6, is subject to a variation.

Accordingly, the output power of the magnetron 2, which is a heating source for cooking food, varies with the variation in the commercial AC voltage. For this reason, even though the user inputs the same cooking command, he/she cannot obtain a desired cooking result because the cooked state of food is not uniform. Consequently, the user has the trouble of having to additionally heat the food.

In other words, the magnetron 2 is driven only when it is applied with a high-power DC voltage of a reference level or more from the magnetron drive voltage generator 7. In this regard, where the magnetron 2 is applied with a DC voltage of less than the reference level due to a variation in the commercial AC voltage, it is not operated as the heating source, leading to a reduction in drive time thereof.

The reduction in the drive time of the magnetron 2 in turn results in a reduction in heating efficiency, thereby causing heating power not to be maintained at a constant level. Besides, in the case where the commercial AC voltage abruptly increases or decreases, the switches of the switching device 6 may be damaged, resulting in a degradation in durability of a product.

SUMMARY OF THE INVENTION

Therefore, the present invention has been made in view of the above problems, and it is an object of the present invention to provide a variable-frequency inverter microwave oven and a method for controlling the same, which can vary a switching frequency of a switching device for AC voltage generation with a variation in a commercial AC voltage supplied to an inverter to lengthen a drive duration of a magnetron, thereby improving heating efficiency and reliability of the inverter microwave oven and preventing internal devices thereof from being damaged.

In accordance with one aspect of the present invention, the above and other objects can be accomplished by the provision of a variable-frequency inverter microwave oven comprising: a magnetron for generating electromagnetic waves; direct current (DC) voltage generation means for rectifying and smoothing a commercial alternating current (AC) voltage to generate a DC voltage, the commercial AC voltage being an inverter drive voltage; switching means for performing a switching operation based on the DC voltage from the DC voltage generation means to generate an AC voltage for the driving of the magnetron, the switching means including a plurality of switches turned on/off in response to the DC voltage from the DC voltage generation means; variable-frequency control means for varying a switching frequency of the switching means according to a level of the DC voltage from the DC voltage generation means to maintain the AC voltage from the switching means at a constant level; and magnetron drive voltage generation means for converting the AC voltage from the switching means into a high-power DC voltage and transferring the converted DC voltage to the magnetron to drive it.

In accordance with another aspect of the present invention, there is provided a method for controlling a variable-frequency inverter microwave oven, comprising the steps of: a) rectifying and smoothing a commercial AC voltage into a DC voltage; b) varying a switching frequency of a switching device with a variation in the DC voltage; and c) performing a switching operation of the switching device at the varied switching frequency to generate an AC voltage, and driving a magnetron using the generated AC voltage.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 3:
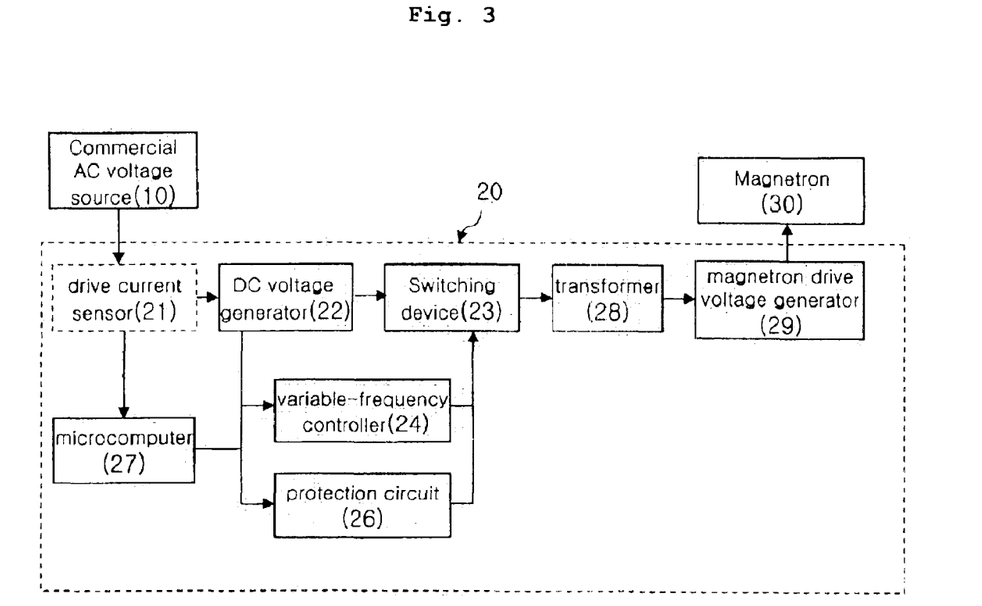
FIG. 3 is a functional block diagram of a variable-frequency inverter microwave oven in accordance with the present invention.

FIG. 3 is a functional block diagram of a variable-frequency inverter microwave oven in accordance with the present invention. As shown in this drawing, the variable-frequency inverter microwave oven comprises a commercial AC voltage source 10 for supplying a commercial AC voltage of 220V-60 Hz, a magnetron 30 for generating electromagnetic waves, and an inverter 20 for generating a high-power DC voltage, or a magnetron drive DC voltage, of 4000V or more according to the commercial AC voltage supplied from the commercial AC voltage source 10 and applying the generated high-power DC voltage to the magnetron 30 to drive it so as to heat and cook food in the microwave oven.

The inverter 20 includes, as shown in FIG. 3, a DC voltage generator 22 including a bridge diode and serving to rectify and smooth the commercial AC voltage from the commercial AC voltage source 10 to generate a DC voltage, and a switching device 23 for performing a switching operation based on the DC voltage from the DC voltage generator 22 to generate an AC voltage. To this end, the switching device 23 has a plurality of switches turned on/off in response to the DC voltage from the DC voltage generator 22.

The inverter 20 further includes a variable-frequency controller 24 for varying a switching frequency of the switching device 23 according to the level of the DC voltage from the DC voltage generator 22 to maintain the AC voltage from the switching device 23 at a constant level, and a magnetron drive voltage generator 29 for converting the constant-level AC voltage from the switching device 23 into a high-power DC voltage appropriate to the driving of the magnetron 30 and apply the converted DC voltage to the magnetron 30 to drive it.

Note that the commercial AC voltage supplied from the commercial AC voltage source 10 may have different values according to different countries or regions although it has been disclosed herein to have the value of 220V-60 Hz. In addition, although the DC voltage required for the driving of the magnetron 30 has been disclosed to be 4000V or more, it may be set to different values according to different manufacturers.

The inverter 20 further includes a drive current sensor 21 for sensing a variation in the commercial AC voltage supplied from the commercial AC voltage source 10, namely, a variation in input drive current to the inverter 20, and a protection circuit 26 for, if the level of the DC voltage from the DC voltage generator 22 is higher than or equal to a predetermined threshold voltage level, turning off the switching device 23 to prevent the switches thereof from being damaged.

The inverter 20 further includes a microcomputer 27 for controlling the output power of the microwave oven in response to a cooking command inputted through a cooking command input unit provided at the outer surface of the oven and outputting a control signal in response to the variation in the drive current sensed by the drive current sensor 21 to vary the switching frequency of the switching device 23 correspondingly to the sensed drive current variation.

The inverter 23 further includes a transformer 28 connected between the switching device 23 and the magnetron drive voltage generator 29. The transformer 28 has a turn ratio of 1:20 to 1:40 as in the general inverter microwave oven. The AC voltage, generated according to the switching operation of the switching device 23, is thus boosted 20 to 40 times based on the turn ratio of the transformer 28.

Therefore, the AC voltage generated by the switching device 23 is boosted to a high level through the transformer 28 and applied to the magnetron drive voltage generator 29, which then converts the applied high-level AC voltage into a high-power DC voltage and applies the converted DC voltage to the magnetron 30.

The variable-frequency controller 24 is adapted to vary the switching frequency at which the switches of the switching device 23 are turned on/off, according to the level of the DC voltage from the DC voltage generator 22. That is, if the level of the DC voltage from the DC voltage generator 22 is lower than a predetermined reference level, the variable-frequency controller 24 lengthens a high-level duration of a drive pulse to the switching device 23. As a result, the switching device 23 performs the switching operation based on the DC voltage from the DC voltage generator 22 for the lengthened high-level duration of the drive pulse, so as to output a higher AC voltage.

To the contrary, if the level of the DC voltage from the DC voltage generator 22 is higher than the predetermined reference level, the variable-frequency controller 24 shortens the high-level duration of the drive pulse to the switching device 23. As a result, the switching device 23 performs the switching operation based on the DC voltage from the DC voltage generator 22 for the shortened high-level duration of the drive pulse, so as to output a lower AC voltage.

In this manner, in the case where the DC voltage from the DC voltage generator 22 is lower in level, the switching device 23 generates an AC voltage corrected to a higher level under the variable-frequency control of the variable-frequency controller 24 and transfers the generated AC voltage to the magnetron 30 through the transformer 28 and magnetron drive voltage generator 29, thereby raising the heating power of the magnetron 30.

Similarly, in the case where the DC voltage from the DC voltage generator 22 is higher in level, the switching device 23 generates an AC voltage corrected to a lower level under the variable-frequency control of the variable-frequency controller 24 and transfers the generated AC voltage to the magnetron 30 through the transformer 28 and magnetron drive voltage generator 29, thereby lowering the heating power of the magnetron 30. Consequently, the heating power of the magnetron 30 is maintained at a constant level.

Figure 4:
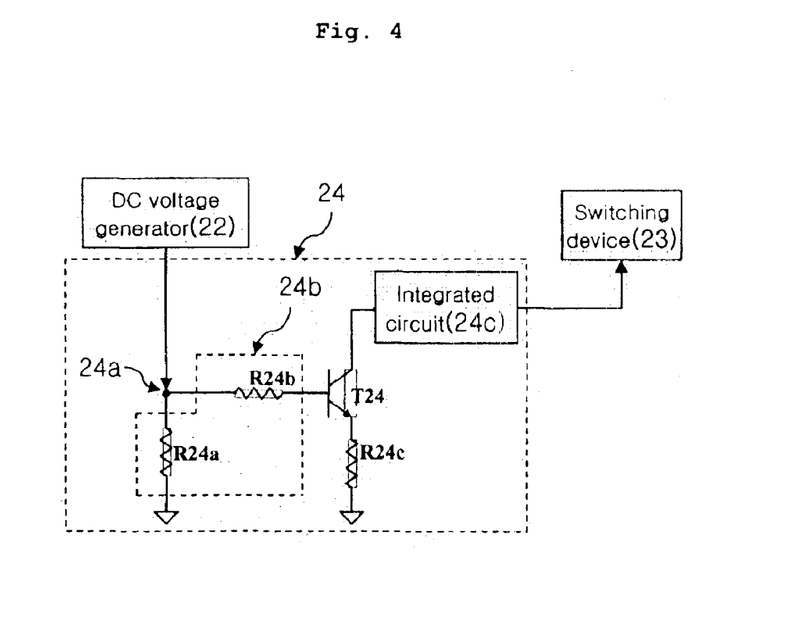
FIG. 4 is a circuit diagram of a variable-frequency controller in FIG. 3.

FIG. 4 is a circuit diagram of the variable-frequency controller 24 in FIG. 3.

As shown in FIG. 4, the variable-frequency controller 24 includes a DC voltage input node 24a for receiving the DC voltage from the DC voltage generator 22 inputted thereto, a current source 24b for generating current based on the DC voltage inputted to the DC voltage input node 24a, and an integrated circuit 24c for varying the switching frequency of the switching device 23 according to the amount of the current from the current source 24b. The current source 24b is provided with one or more resistors R24a and R24b.

The integrated circuit 24c is typically used for the variable-frequency control and adapted to vary the width of its output pulse with the amount of input current thereto. If the amount of the current from the current source 24b is smaller, the integrated circuit 24c widens the width of its output pulse and outputs the resulting lower-frequency pulse. To the contrary, if the amount of the current from the current source 24b is larger, the integrated circuit 24c narrows the width of its output pulse and outputs the resulting higher-frequency pulse.

The variable-frequency controller 24 further includes a transistor T24 having its base connected to the current source 24b, its collector connected to the integrated circuit 24c and its emitter connected to a resistor R24c. With this configuration, the amount of current at the collector of the transistor T24, which is determined depending on the amount of current at the base of the transistor T24, is applied to the integrated circuit 24c for the variable-frequency control.

Figure 5A:
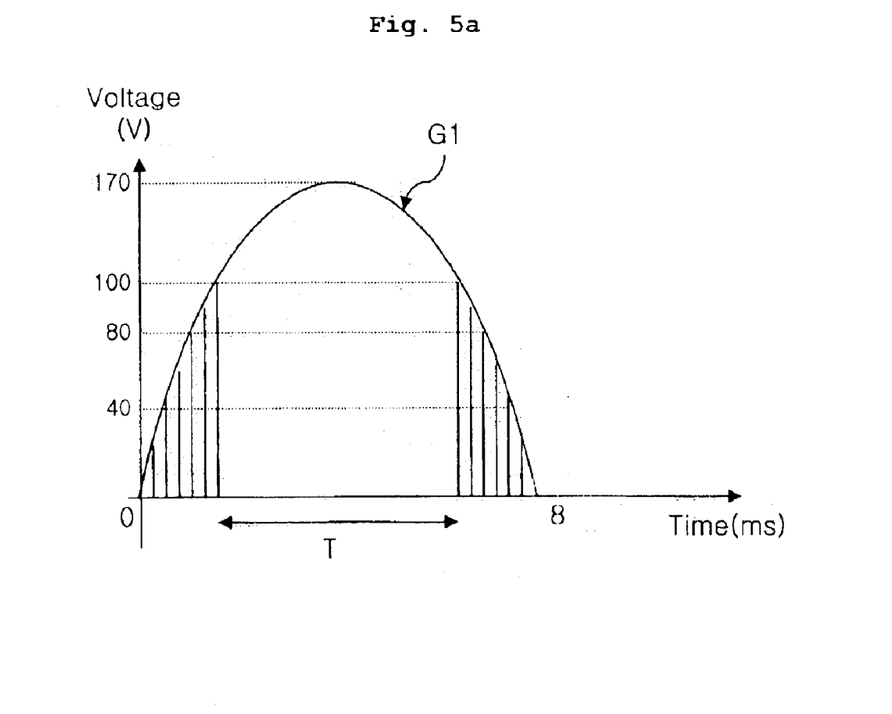
FIGS. 5a to 5c are waveform diagrams of voltages and frequencies generated in the conventional inverter microwave oven and the present variable-frequency inverter microwave oven.

FIG. 5a shows a waveform G1 of an output voltage from the switching device 23 under the condition that the variable-frequency control operation of the present invention is not performed, as in the conventional inverter microwave oven. The waveform G1 of FIG. 5a schematically represents only an envelope of the AC voltage generated from the switching device 23 for the purpose of waveform comparison.

Figure 5B:
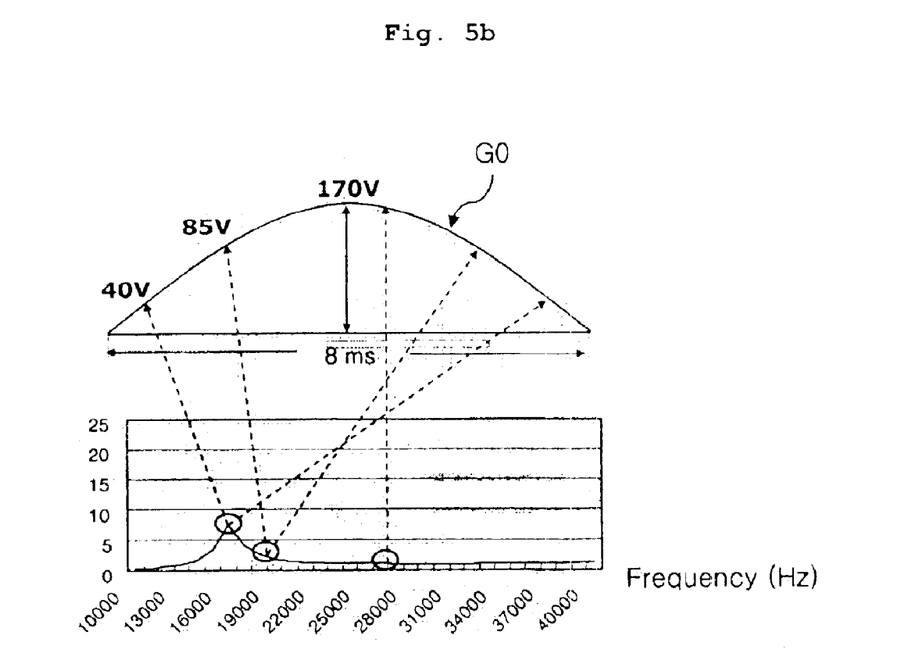

As shown in FIG. 5a, the envelope waveform G1 of the AC voltage generated by the switching operation of the switching device 23 has a period of 8 ms and a peak level of about 170V. This envelope waveform G1 follows a waveform G0 of the input DC voltage to the switching device 23 as shown in FIG. 5b.

For example, provided that the output voltage from the switching device 23 must be at least 100V for the driving of the magnetron 30 in the inverter microwave oven, the magnetron 30 is not driven in shaded areas (0 through less than 100V) of the start and end portions of the envelope waveform G1, so it is used as a heating source for only a drive time T as shown in FIG. 5a.

In other words, as compared with the output voltage from the switching device 23, the drive time T of the magnetron is not sufficient, thereby reducing drive efficiency of the magnetron, or heating efficiency.

The waveform G1 of the output voltage from the switching device 23 follows the waveform G0 of the DC voltage with a ripple component, supplied from the DC voltage generator 22 to the switching device 23. The DC voltage from the DC voltage generator 22 is a rectified/smoothed version of the commercial AC voltage with a real-time variation. In this regard, the waveform G1 of the output voltage from the switching device 23 varies with the variation in the commercial AC voltage and the drive time T of the magnetron thus varies, thereby making it impossible to obtain stable output power.

FIG. 5b shows a frequency Hz that the variable-frequency controller 24 outputs to control the switching frequency of the switching device 23 according to the waveform G0 of the input DC voltage to the switching device 23.

That is, the variable-frequency controller 24 outputs a highest frequency of about 27000 Hz at a peak level of 170V of the input DC voltage to the switching device 23, and a lower frequency of about 16000 Hz at a level of 40V of the input DC voltage. In this manner, the variable-frequency controller 24 generates a frequency corresponding to the level of the DC voltage from the DC voltage generator 22 and outputs the generated frequency to the switching device 23 to vary the switching frequency of the switching device 23 so that the switching device 23 can generate a constant-level AC voltage and the magnetron 30 can thus have a constant-power value.

Figure 5C:
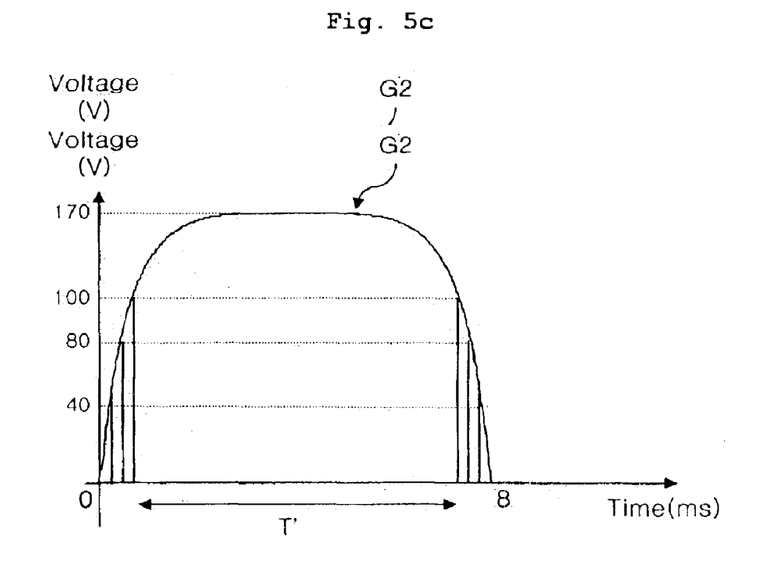

FIG. 5c shows a waveform G2 of an output voltage from the switching device 23 based on the variable-frequency control of the variable-frequency controller 24 as shown in FIG. 5b. The waveform G2 of FIG. 5c and the waveform G1 of FIG. 5a, not based on the variable-frequency control, are compared as follows.

As shown in FIG. 5c, the shaded areas of the waveform G1 of FIG. 5a, or periods in which the magnetron 30 cannot be driven, are shortened under the variable-frequency control. The reason is that, under the variable-frequency control, voltage levels of the shaded areas of the waveform G1 are raised and a ridge of the waveform G1 having the peak level is thus flatted, which leads to the conversion of the waveform G1 into a square waveform such as the waveform G2.

Accordingly, the drive time T of the magnetron 30 in FIG. 5a is lengthened to become a drive time T in FIG. 5b, thereby increasing the heating efficiency. Besides, even when the peak level of the input DC voltage is raised due to an abrupt increase in the commercial AC voltage, it is limited to a desired value under the variable-frequency control, thereby preventing the switches of the switching device 23 from being damaged.

Figure 6A:
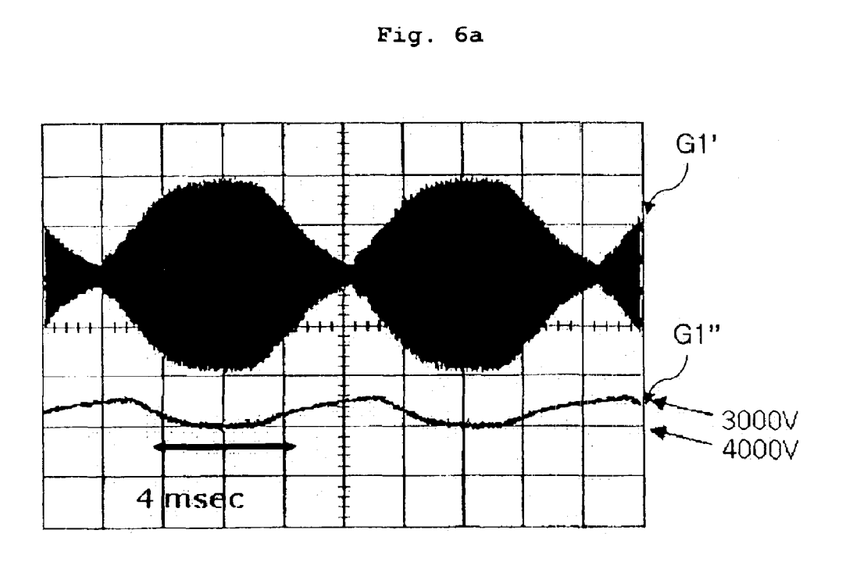
FIGS. 6a and 6b are waveform diagrams of switching device output voltages and magnetron drive voltages generated in the conventional inverter microwave oven and the present variable-frequency inverter microwave oven.

FIG. 6a shows a waveform G1' of the output AC voltage from the switching device 23 corresponding to the waveform G1 of FIG. 5a, experimentally obtained under the condition that the variable-frequency control operation of the present invention is not performed, as in the conventional inverter microwave oven.

The waveform G1' of FIG. 6a corresponds to the AC voltage generated by the switching device 23 on the basis of the DC voltage from the DC voltage generator 22 without the variable-frequency control. The lower waveform G1" of FIG. 6a corresponds to a magnetron drive voltage generated according to the AC voltage from the switching device 23.

As shown in FIG. 6a, the magnetron drive voltage is maintained at the level of 4000V for only 4 ms of one period, 8 ms, as indicated by a solid line of the waveform G1". This duration of 4 ms is equal to the magnetron drive time T.

Figure 6B:
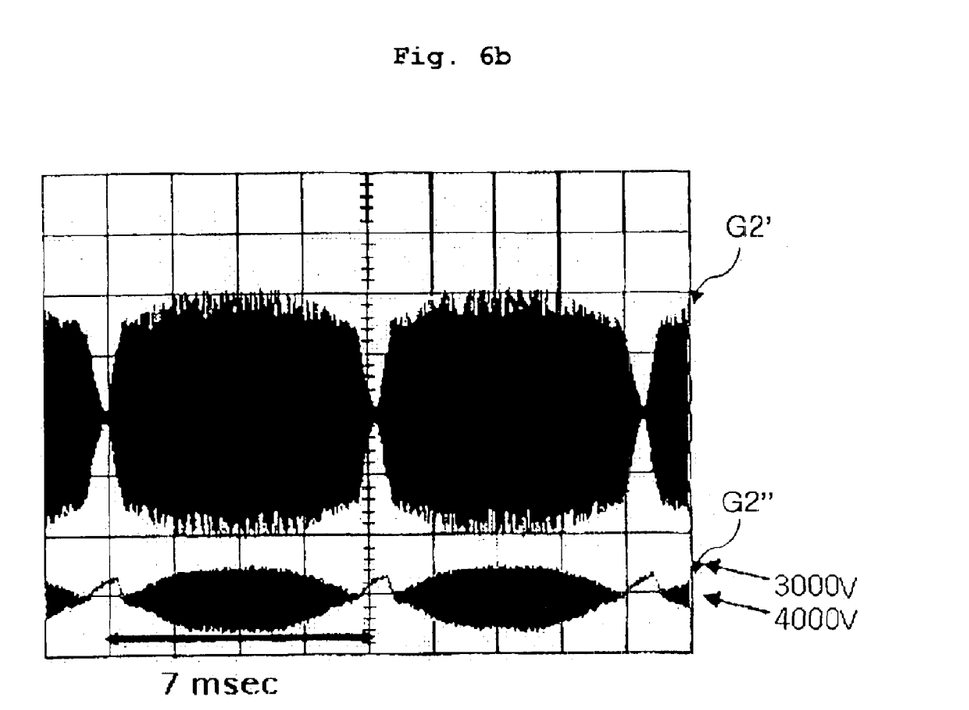

The upper waveform G2' of FIG. 6b corresponds to a square-wave AC voltage of 120 Hz outputted from the switching device 23 after the variable-frequency control is performed, and the lower waveform G2" corresponds to a magnetron drive voltage generated according to the square-wave AC voltage.

As shown in FIG. 6b, the magnetron drive voltage is maintained at the level of 4000V for 7 ms of one period, 8 ms, as seen from the waveform G2". This duration of 7 ms is equal to the magnetron drive time T' in FIG. 5c. Therefore, according to the present invention, the magnetron drive time is increased from the conventional value, 4 ms, to 7 ms on a period basis, resulting in an increase in the magnetron drive efficiency of the microwave oven, or the heating efficiency, with respect to the input voltage.

Figure 7:
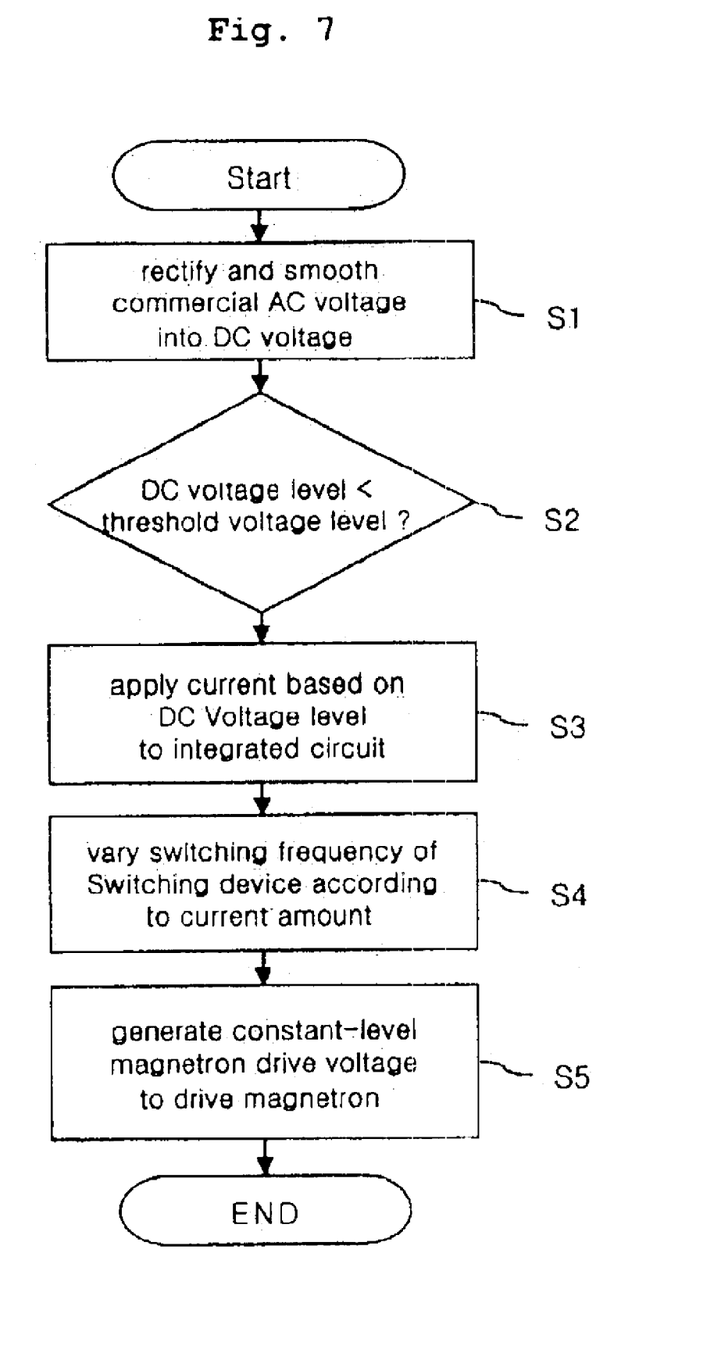
FIG. 7 is a flow chart illustrating a method for controlling the variable-frequency inverter microwave oven in accordance with the present invention.

FIG. 7 is a flow chart illustrating a method for controlling the variable-frequency inverter microwave oven in, accordance with the present invention.

First, a commercial AC voltage supplied to the home is rectified and smoothed into a DC voltage of 120 Hz with a ripple component (S1).

At this time, the internal devices of the microwave oven may be damaged due to an abrupt increase or decrease in the commercial AC voltage resulting from a real-time variation therein. In order to avoid this problem, the level of the DC voltage is compared with a predetermined threshold voltage level (S2). If the level of the DC voltage is higher than or equal to the predetermined threshold voltage level, the inverter circuit operation is forced to be shut down to protect the internal devices.

In the case where the level of the DC voltage is lower than the predetermined threshold voltage level, a different amount of current based on a variation in the DC voltage level is applied to the integrated circuit of the variable-frequency controller (S3).

The variable-frequency controller varies a switching frequency of the switching device according to the amount of current applied thereto to determine a switching operation of the switching device (S4).

At this time, if the level of the DC voltage is lower than a predetermined reference level, the switching frequency of the switching device is lowered. However, in the case where the level of the DC voltage is higher than the predetermined reference level, the switching frequency of the switching device is raised. In this manner, the variable-frequency control is performed.

Thereafter, the switches of the switching device are turned on/off at the switching frequency based on the variable-frequency control, thereby enabling the magnetron drive voltage generator to generate a constant-level magnetron drive voltage to drive the magnetron (S5).

As apparent from the above description, the present invention provides a variable-frequency inverter microwave oven and a method for controlling the same, wherein a switching frequency of a switching device is controlled in a variable manner according to the level of an input DC voltage to the switching device so that the switching device can generate a square-wave AC voltage. Therefore, a drive duration of a magnetron is lengthened compared with a conventional one, thereby improving heating efficiency of the microwave oven. Further, a peak level of the AC voltage from the switching device is limitedly raised with an abrupt increase in the input DC voltage under the variable-frequency control, whereby internal devices of the microwave oven can be protected to guarantee stability thereof.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A variable-frequency inverter microwave ovens comprising:

a magnetron that generates electromagnetic waves;

a direct current (DC) voltage generator that rectifies and smooths a commercial alternating current (AC) voltage to generate a DC voltage, the commercial AC voltage being an inverter drive voltage;

a switcher that performs a switching operation based on said DC voltage from said DC voltage generator to generate an AC voltage that drives said magnetron, said switcher including a plurality of switches that are turned on/off in response to said DC voltage from said DC voltage generator;

variable-frequency controller that controls a switching frequency of said switcher according to a level of said DC voltage from said DC voltage generator to maintain said AC voltage from said switcher at a constant level; and magnetron drive voltage generator that converts said AC voltage from said switcher into a high-power DC voltage and transfers said converted DC voltage to said magnetron to drive said magnetron, said variable-frequency controller comprising:

a DC voltage input node that receives said generated DC voltage;

a current source that supplies a switching current for the switching operation of said switcher, based on said DC voltage inputted to said DC voltage input node; and a frequency generator that generates a predetermined frequency in accordance with an amount of said switching current supplied from said current source and outputs said predetermined frequency to said switcher.

2. The variable-frequency inverter microwave oven of claim 1, further comprising a drive current sensor that senses a current amount of the commercial AC voltage.

3. The variable-frequency inverter microwave oven of claim 2, further comprising a microcomputer that controls an output power of the microwave oven in response to a user's cooking command and a current amount sensed by said drive current sensor.

4. The variable-frequency inverter microwave oven of claim 1, further comprising a protector that turns off said switcher to prevent said switches from being damaged when a level of said DC voltage from said DC voltage generator is at least equal to a predetermined threshold voltage level.

5. The variable-frequency inverter microwave oven of claim 1, wherein said variable-frequency controller further includes a transistor having a base connected to said current source and a collector connected to said frequency generator.

6. The variable-frequency inverter microwave oven of claim 1, wherein said frequency generator is adapted to lower said switching frequency of said switcher when the amount of said switching current supplied from said current source is below a predetermined reference value, and raise said switching frequency of said switcher when said switching current amount is above said predetermined reference value.

7. The variable-frequency inverter microwave oven of claim 1, wherein said frequency generator comprises an integrated circuit.

8. A variable-frequency inverter microwave oven, comprising:
a switcher having a plurality of switches that are turned on/off to perform a switching operation to generate an AC voltage;
a variable-frequency controller that controls a switching frequency of the switcher to maintain the AC voltage from the switcher at a constant level; and
a magnetron drive voltage generator that converts said AC voltage from said switcher into a high-power DC voltage to drive a magnetron of the microwave oven, said variable-frequency controller comprising:
a DC voltage input node that receives a DC voltage;
a current source that supplies a switching current for the switching operation of said switcher, based on the DC voltage inputted to said DC voltage input node; and
a frequency generator that generates a predetermined frequency in accordance with an amount of said switching current supplied from said current source and outputs said predetermined frequency to said switcher.

9. The variable-frequency inverter microwave oven of claim 8, wherein said switcher performs the switching operation in accordance with a level of a generated DC voltage.

10. The variable-frequency inverter microwave oven of claim 8, further comprising a protector that turns off said switcher to protect said switches from damage when a DC voltage level is at least equal to a predetermined threshold voltage level.

11. The variable-frequency inverter microwave oven claim 8, wherein said frequency generator is adapted to lower said switching frequency of said switcher when the amount of said switching current supplied from said current source is below a predetermined reference value, and to raise said switching frequency of said switcher when said switching current amount is above said predetermined reference value.

12. The variable-frequency inverter microwave oven of claim 8, wherein said frequency generator comprises an integrated circuit.

13. A variable-frequency inverter for a microwave oven, comprising:
a switcher having a plurality of switches that are turned on/off to perform a switching operation to generate an AC voltage; and
a variable-frequency controller that controls a switching frequency of the switcher, said variable-frequency controller comprising:
a DC voltage input node that receives a DC voltage;
a current source that supplies a switching current for the switching operation of said switcher, based on the DC voltage inputted to said DC voltage input node; and
a frequency generator that generates a predetermined frequency in accordance with an amount of said switching current supplied from said current source and outputs said predetermined frequency to said switcher.

14. The variable-frequency inverter microwave oven claim 13, wherein said frequency generator is adapted to lower said switching frequency of said switcher when the amount of said switching current supplied from said current source is below a predetermined reference value, and to raise said switching frequency of said switcher when said switching current amount is above said predetermined reference value.

15. The variable-frequency inverter microwave oven of claim 13, further comprising a protector that turns off said switcher to protect said switches from damage when a DC voltage level is at least equal to a predetermined threshold voltage level.

* * * * *

UNITED STATES PATENT AND TRADEMARK OFFICE
CERTIFICATE OF CORRECTION

PATENT NO. : 6,884,977 B2  Page 1 of 1
APPLICATION NO. : 10/630659
DATED : April 26, 2005
INVENTOR(S) : C. S. Lee It is certified that error appears in the above-identified patent and that said Letters Patent is hereby corrected as shown below:

At column 8, line 30 (claim 1, line 1) of the printed patent, "ovens" should be --oven,--.

At column 8, line 49 (claim 1, line 19) of the printed patent, before "magnetron" insert --a--.

At column 9, line 19 (claim 6, line 5) of the printed patent, before "raise" insert --to--.

On the Title Page, at Item (73), Assignee, "Electronic" should be --Electronics--.

At column 10, line 37 (claim 14, line 1) of the printed patent, after "oven" insert --of--.

Signed and Sealed this

First Day of May, 2007

JON W. DUDAS
*Director of the United States Patent and Trademark Office*